United States Patent
Park

(10) Patent No.: US 10,423,327 B2
(45) Date of Patent: Sep. 24, 2019

(54) METHOD AND APPARATUS FOR PROCESSING KEY PAD INPUT RECEIVED ON TOUCH SCREEN OF MOBILE TERMINAL

(71) Applicant: SAMSUNG ELECTRONICS CO., LTD., Suwon-si (KR)

(72) Inventor: Ho-yeon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 630 days.

(21) Appl. No.: 14/295,702

(22) Filed: Jun. 4, 2014

(65) Prior Publication Data

US 2014/0359514 A1    Dec. 4, 2014

(30) Foreign Application Priority Data

Jun. 4, 2013  (KR) .......................... 10-2013-0064323

(51) Int. Cl.
G06F 3/0488    (2013.01)

(52) U.S. Cl.
CPC ................ *G06F 3/04886* (2013.01)

(58) Field of Classification Search
CPC .................................................. G06F 3/04886
USPC ......................................................... 715/773
See application file for complete search history.

(56) References Cited

U.S. PATENT DOCUMENTS

| | | | | |
|---|---|---|---|---|
| 5,805,167 A | * | 9/1998 | van Cruyningen ... | G06F 3/0482 715/808 |
| 6,744,422 B1 | * | 6/2004 | Schillings ............. | G06F 3/0233 341/22 |
| 7,170,430 B2 | * | 1/2007 | Goodgoll .............. | G06F 3/0219 341/22 |
| 7,649,478 B1 | * | 1/2010 | Yoon ...................... | H03M 11/08 341/107 |
| 8,081,092 B2 | * | 12/2011 | Laufkotter ............. | H03M 11/10 341/20 |
| 9,250,710 B2 | * | 2/2016 | Molgaard ............. | G06F 3/0489 |
| 2002/0041261 A1 | * | 4/2002 | Lee ........................ | G06F 3/0236 345/27 |
| 2002/0175834 A1 | * | 11/2002 | Miller ................... | G06F 3/0233 341/22 |
| 2003/0121964 A1 | * | 7/2003 | Crisan ................... | G06F 3/0234 235/60 R |
| 2004/0153963 A1 | * | 8/2004 | Simpson ............... | G06F 3/0237 715/202 |

(Continued)

FOREIGN PATENT DOCUMENTS

KR    10-2010-0086975 A    8/2010
KR    10-2010-0117770 A    11/2010

(Continued)

*Primary Examiner* — Ryan F Pitaro
*Assistant Examiner* — Henry Orr
(74) *Attorney, Agent, or Firm* — Sughrue Mion, PLLC

(57) ABSTRACT

A method of processing an input received through a touch screen in a mobile terminal. The method includes displaying, if a first key to which a plurality of key values are allocated is input, a second key to which a plurality of the key values are allocated, on a screen, and determining a first key value displayed at a cursor by an input of the first key as a final input value if the second key is input, moving the cursor to a next first position, and then displaying one of the plurality of key values of the first key.

9 Claims, 9 Drawing Sheets

(56) References Cited

U.S. PATENT DOCUMENTS

| | | | | |
|---|---|---|---|---|
| 2004/0201576 A1* | 10/2004 | Shimada | G06F 3/018 | 345/173 |
| 2004/0263360 A1* | 12/2004 | Husak | G06F 3/0235 | 341/22 |
| 2005/0104869 A1* | 5/2005 | Chung | G06F 3/018 | 345/179 |
| 2005/0174327 A1* | 8/2005 | Lee | G08C 17/00 | 345/158 |
| 2006/0107210 A1* | 5/2006 | Lee | G06F 3/0237 | 715/261 |
| 2006/0230347 A1* | 10/2006 | Han | G06F 3/0233 | 715/262 |
| 2007/0040813 A1* | 2/2007 | Kushler | G06F 3/0237 | 345/173 |
| 2007/0100635 A1* | 5/2007 | Mahajan | G10L 15/22 | 704/276 |
| 2007/0139225 A1* | 6/2007 | Lee | G06F 1/1626 | 341/22 |
| 2007/0182595 A1* | 8/2007 | Ghasabian | G06F 1/1615 | 341/22 |
| 2007/0188472 A1* | 8/2007 | Ghassabian | B41J 3/445 | 345/169 |
| 2008/0139227 A1* | 6/2008 | Wong | G06F 3/0237 | 455/466 |
| 2008/0297480 A1* | 12/2008 | Lee | G06F 3/018 | 345/169 |
| 2010/0085313 A1* | 4/2010 | Rider | G06F 3/04886 | 345/173 |
| 2011/0029862 A1* | 2/2011 | Scott | G06F 3/0237 | 715/261 |
| 2011/0047456 A1* | 2/2011 | Sharan | G06F 3/0236 | 715/261 |
| 2011/0109558 A1* | 5/2011 | Park | G06F 3/0233 | 345/171 |
| 2011/0304483 A1* | 12/2011 | Moon | G06F 3/0236 | 341/22 |
| 2012/0149477 A1* | 6/2012 | Park | G06F 3/0202 | 463/43 |
| 2012/0154181 A1* | 6/2012 | Rhee | H03M 11/08 | 341/26 |
| 2012/0326988 A1* | 12/2012 | Woo | G06F 3/0235 | 345/171 |
| 2013/0307781 A1* | 11/2013 | Ghassabian | G06F 3/0487 | 345/168 |
| 2014/0043240 A1* | 2/2014 | Chou | G06F 3/018 | 345/171 |
| 2014/0115491 A1* | 4/2014 | Cullin | G06F 3/0233 | 715/745 |
| 2014/0359514 A1* | 12/2014 | Park | G06F 3/04886 | 715/773 |

FOREIGN PATENT DOCUMENTS

| | | |
|---|---|---|
| KR | 10-2011-0004815 A | 1/2011 |
| KR | 10-2011-0034235 A | 4/2011 |
| KR | 10-1046826 B1 | 7/2011 |
| KR | 10-1083178 B1 | 11/2011 |
| KR | 10-1098727 B1 | 12/2011 |
| KR | 10-1103452 B1 | 1/2012 |
| KR | 10-1139973 B1 | 5/2012 |
| KR | 10-2012-0056179 A | 6/2012 |
| KR | 10-2012-0078518 A | 7/2012 |
| KR | 10-2012-0084242 A | 7/2012 |

\* cited by examiner

METHOD AND APPARATUS FOR PROCESSING KEY PAD INPUT RECEIVED ON TOUCH SCREEN OF MOBILE TERMINAL

RELATED APPLICATION

This application claims the benefit of Korean Patent Application No. 10-2013-0064323, filed on Jun. 4, 2013, in the Korean Intellectual Property Office, the disclosure of which is incorporated herein in its entirety by reference.

BACKGROUND

1. Field

Methods and apparatuses consistent with exemplary embodiments relate to a method and apparatus for processing a user's key pad input received on a touch screen of a mobile terminal.

2. Description of the Related Art

Currently, with mobile terminals, a method of displaying a keypad on a screen and processing a user's key input through a touch screen is generally used. In the mobile terminal, the size of the screen is limited, and thus the number of keys (buttons) that may be displayed in the screen is also limited. In order to improve user convenience, generally a plurality of key values are allocated to one key, and key values are allocated according to the number of times of a key input are consecutively selected.

However, in such a scheme, when trying to continually input the key values allocated to one key, a user needs to inconveniently wait for a predetermined time or push the space key to move to the next position after inputting the initial value.

FIG. 1 is a diagram illustrating a problem of a general key input scheme.

As illustrated in the left side of FIG. 1, the user tries to input "summer." The user needs to use a key 101 to which "m" is allocated in order to input "mm." However, in order to input "mm", the user needs to wait for a predetermined time until a cursor moves to the next position after initially pushing the key 101 or needs to intentionally push the space key 102 to move the cursor to the next position. If the user pushes the key 101 twice within a short interval, the "n" is input instead of "mm". This is because, when the initial key 101 is pushed, "m" is displayed, and, when the key 101 is pushed again within a short time, the "m" is changed to "n", which is the key value allocated to the key 101 when it is consecutively pushed within a short time. As a result, "suner" is typed instead of "summer" (which the user intended to type), as shown in the right side of FIG. 1, and this is obviously a typographical error.

SUMMARY

One or more exemplary embodiments include a method and apparatus for continuously, quickly and conveniently inputting key values allocated to one key in a keypad to which a plurality of key values are allocated to one key.

Additional aspects will be set forth in part in the description which follows and, in part, will be apparent from the description, or may be learned by practice of the presented embodiments.

According to one or more exemplary embodiments, a method of processing an input received through a touch screen in a mobile terminal, includes: displaying, if a first key to which a plurality of key values are allocated is input, a second key to which a plurality of the key values are allocated, on a screen; and determining a first key value displayed at a cursor by an input of the first key as a final input value if the second key is input, moving the cursor to a next first position, and then displaying one of the plurality of key values of the first key.

The method may further include: sequentially displaying the plurality of key values of the first key without moving the position of the cursor, whenever the second key is repeatedly input after the cursor is moved; and determining a second key value displayed at the cursor by an input of the second key as the final input value if the first key is input, moving the cursor to a next second position, and then displaying one of the plurality of key values of the second key.

The displaying of the second key may include sequentially displaying the plurality of key values of the second key without moving the position of the cursor whenever the first key is repeatedly input.

According to one or more exemplary embodiments, a method of processing an input received through a touch screen in a mobile terminal, includes: sequentially displaying a plurality of key values without moving a position of a cursor whenever a tab input for a key to which the plurality of key values are allocated, is received; searching for a key value mapped with a direction of a drag input among the displayed plurality of key values when a drag input for the key is received; and determining a key value displayed at the cursor due to the received tab input as a final input value, moving the cursor to a next position, and then displaying the searched for key value.

The method may further include sequentially displaying the plurality of key values without moving the position of the cursor whenever the tab input for the key is received in a state where the searched for key value is displayed.

A first key value and a second key value may be allocated to the key, the first key value may be displayed on a left part of an internal side of the key displayed on the touch screen, the second key value may be displayed on a right part of the internal side of the key displayed on the touch screen, the first key value may be mapped to a drag input of a left direction of the key, and the second key value may be mapped to a drag input of a right direction of the key.

According to one or more exemplary embodiments, a mobile terminal includes: a memory configured to store at least one program; and a processor configured to process an input received through a touch screen by executing the at least one program, wherein the at least one program comprises commands for performing: displaying, if a first key to which a plurality of key values are allocated is input, a second key to which a plurality of the key values are allocated, on a screen; and determining a first key value displayed in a cursor by an input of the first key as a final input value if the second key is input, moving the cursor to a next first position, and then displaying one of the plurality of key values of the first key.

The at least one program may further include commands for performing: sequentially displaying the plurality of key values of the first key without moving the position of the cursor, whenever the second key is repeatedly input after the cursor is moved; and determining a second key value displayed at the cursor by an input of the second key as the final input value if the first key is input, moving the cursor to a next second position, and then displaying one of the plurality of key values of the second key.

The displaying of the second key may include sequentially displaying the plurality of key values of the second key without moving the position of the cursor whenever the first key is repeatedly input.

According to one or more exemplary embodiments, a mobile terminal includes: a memory configured to store at least one program; and a processor configured to process an input received through a touch screen by executing the at least one program, wherein the at least one program comprises commands for performing: sequentially displaying a plurality of key values without moving a position of a cursor whenever a tab input for a key to which the plurality of key values are allocated, is received; searching for a key value mapped with a direction of a drag input among the displayed plurality of key values when a drag input for the key is received; and determining a key value displayed at the cursor due to the received tab input as a final input value, moving the cursor to a next position, and then displaying the searched for key value.

The at least one program may include commands for performing: sequentially displaying the plurality of key values without moving the position of the cursor whenever the tab input for the key is received in a state where the searched for key value is displayed.

A first key value and a second key value may be allocated to the key, the first key value may be displayed on a left part of an internal side of the key displayed on the touch screen, the second key value may be displayed on a right part of the internal side of the key displayed on the touch screen, the first key value may be mapped to a drag input of a left direction of the key, and the second key value may be mapped to a drag input of a right direction of the key.

According to one or more exemplary embodiments, a non-transitory computer-readable recording medium has stored thereon a computer program, which, when executed by a computer, performs the above method.

According to one or more exemplary embodiments, different values among the plurality of key values of the first key may be displayed when the second key is pushed without delay after the first key is input.

The at least one program may further comprise commands for performing: displaying different values among the plurality of key values of the first key when the second key is pushed without delay after the first key is input.

According to one or more exemplary embodiments, a mobile terminal comprises: a memory configured to store at least one program; and a processor configured to process an input received through a touch screen by executing the at least one program, wherein the at least one program comprises commands for performing: displaying a first key to which a plurality of key values are allocated; displaying a second key to which a plurality of the key values are allocated, on a screen; and determining a first key value displayed in a cursor by an input of the first key as a final input value if the second key is input, moving the cursor to a next first position, and then displaying one of the plurality of key values of the first key.

According to one or more exemplary embodiments, a method of processing an input received through a touch screen in a mobile terminal, comprises: displaying a first key to which a plurality of key values are allocated; displaying a second key to which a plurality of key values are allocated; and determining a first key value displayed at a cursor by an input of the first key as a final input value if the second key is input, moving the cursor to a next first position, and then displaying one of the plurality of key values of the first key.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
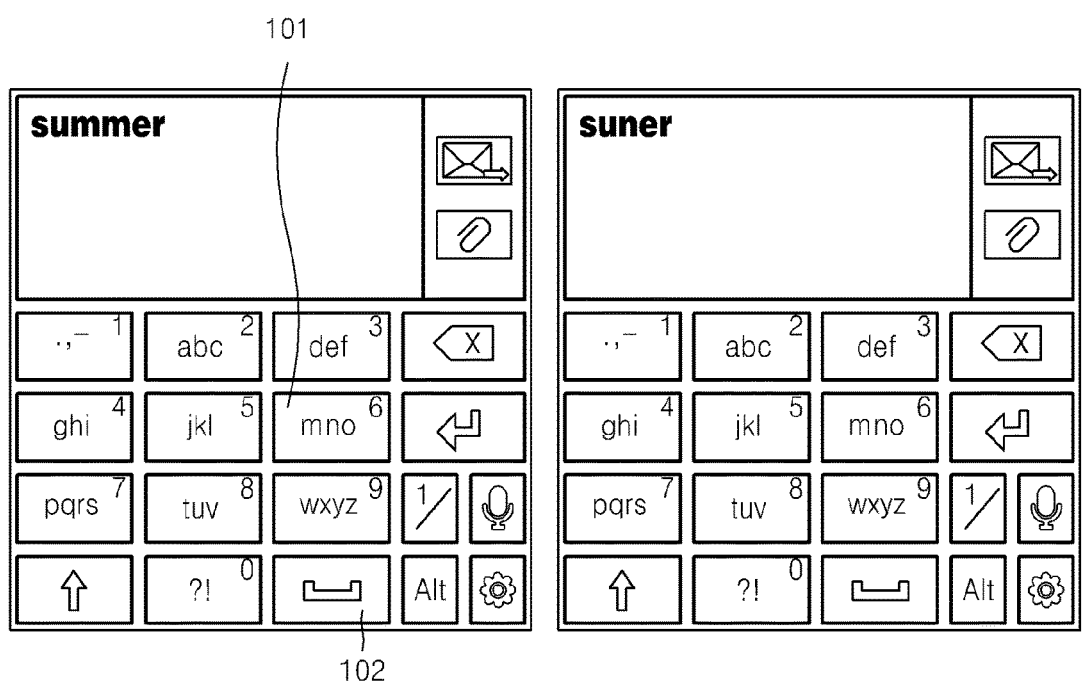
FIG. 1 is a diagram illustrating a problem of a general key input scheme.

Reference will now be made in detail to embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the embodiments are merely described below, by referring to the figures, to explain aspects of the present description.

Figure 2A:
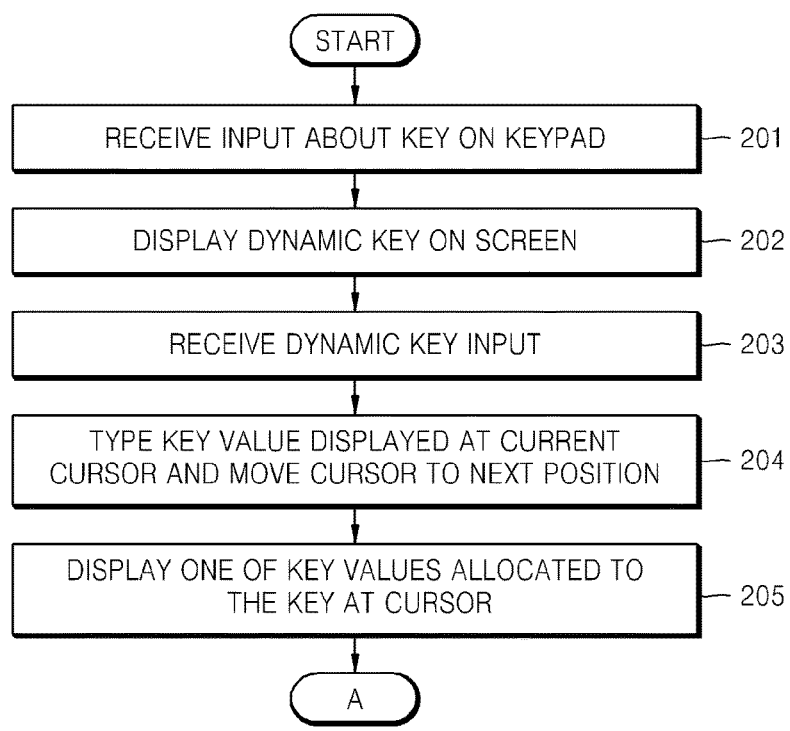
FIGS. 2A and 2B are flowcharts illustrating a key input scheme that uses a dynamic key according to an exemplary embodiment.
Figure 2B:
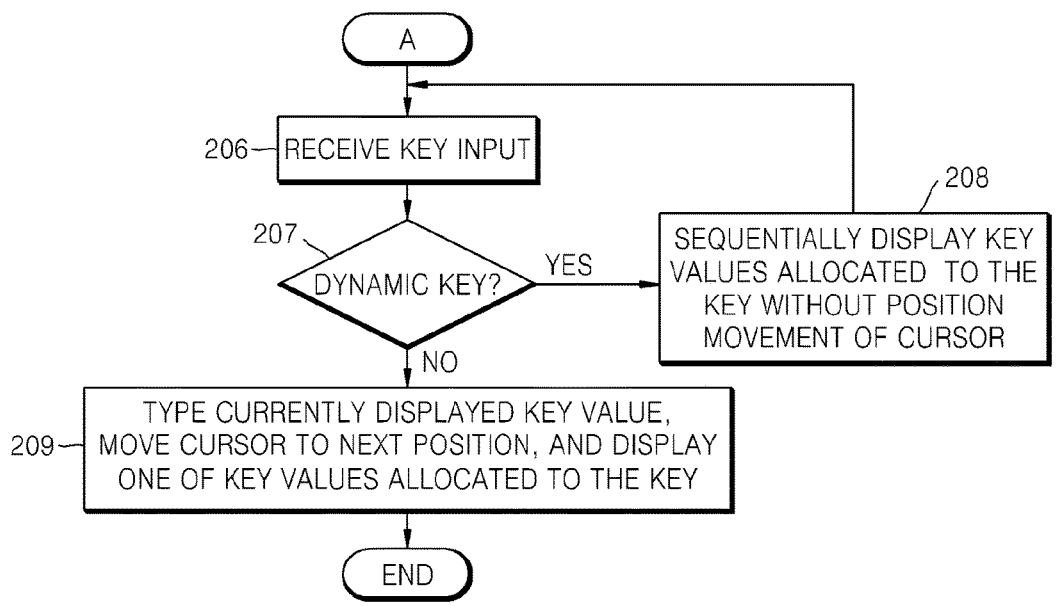

FIGS. 2A and 2B are flowcharts illustrating a key input scheme that uses a dynamic key according to an exemplary embodiment.

In operation 201, a mobile terminal receives a user's input for a key on a keypad displayed on a screen through a touch screen. Here, the key input by the user represents one key to which a plurality of key values are allocated, and the key values refers to all values that may be input through the keypad, such as letters, numbers, and symbols.

In operation 202, the mobile terminal displays a dynamic key on the screen. Here, the dynamic key refers to another key to which key values allocated to the key input by the user, i.e., key values which are sequentially displayed at a cursor location when the key input by the user is repeatedly pushed, are allocated.

In operation 203, the mobile terminal receives a dynamic key input through a touch screen.

In operation 204, the mobile terminal types the key value displayed at the current cursor in an input window, and the mobile terminal moves the cursor to the next position. Here, the key value displayed at the cursor is an input value having temporary attributes in a state where the value may be changed to another key value by pushing the key again, but the fact that the key value has been typed refers to the fact that the key value displayed at the cursor has been determined as the final input value in the corresponding position.

In operation 205, the mobile terminal displays one of the key values allocated to the key at the cursor. The first value among the key values allocated to the key, i.e., the first value among the key values sequentially displayed whenever the key is repeatedly pushed, may be displayed.

Likewise, if a dynamic key is pushed according to an exemplary embodiment, when the user tries to continually input the key values allocated to one key, the user does not need to wait for a predetermined time or push the space key. Even if the key in the original keypad is pushed and then the dynamic key displayed according thereto is pushed without delay, the key value displayed by the initial key input is not changed, but the key value displayed by the first key input is typed and the key value may be promptly input at the next position.

FIG. 2B is a diagram illustrating a process of processing a key input which is additionally received after pushing the dynamic key in FIG. 2A.

In operation 206, the mobile terminal receives a user's key input through a touch screen.

In operation 207, the mobile terminal determines whether the key input received in operation 206 is an input of the dynamic key. If the input is based on a pressing of the dynamic key, the procedure moves to operation 208. If the key input received in operation 206 is an input of the key on the original keypad, the procedure moves to operation 209.

In operation 208, the mobile terminal sequentially displays the key values allocated to the key, without moving the location of the cursor. Here, the first value among the key values allocated to the key may be displayed.

In operation 209, the mobile terminal types currently displayed key values and the mobile terminal moves the cursor to the next position to display one of the key values allocated to the key. Here, the first value among the key values allocated to the key is displayed.

Figure 3A:
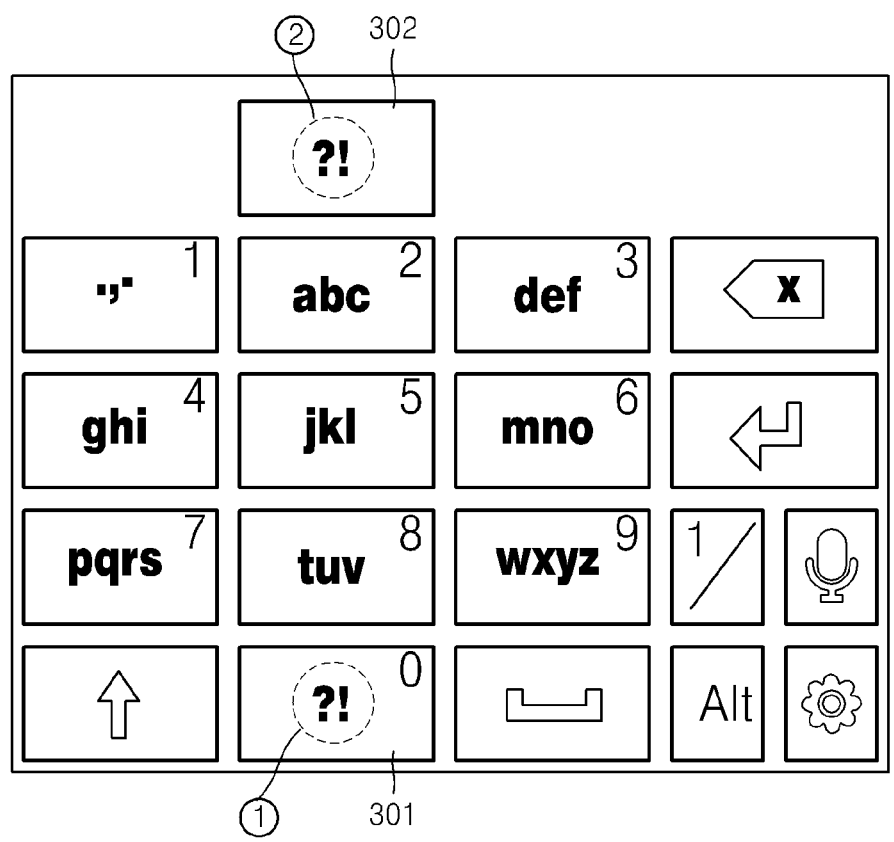
FIG. 3A is a diagram illustrating a keypad that displays a dynamic key according to an exemplary embodiment.

FIG. 3A is a diagram illustrating a keypad that displays a dynamic key according to an exemplary embodiment. If the user pushes one key 301, a dynamic key 302, which is another key to which the key values that are allocated to the key 301 are also allocated, is displayed on the screen. The user may continuously input "?" or "!" which is a value allocated to the key 301 by pushing the dynamic key 302 without delay after pushing the key 301. A more specific key input method will be described below with reference to FIG. 3B.

Figure 3B:
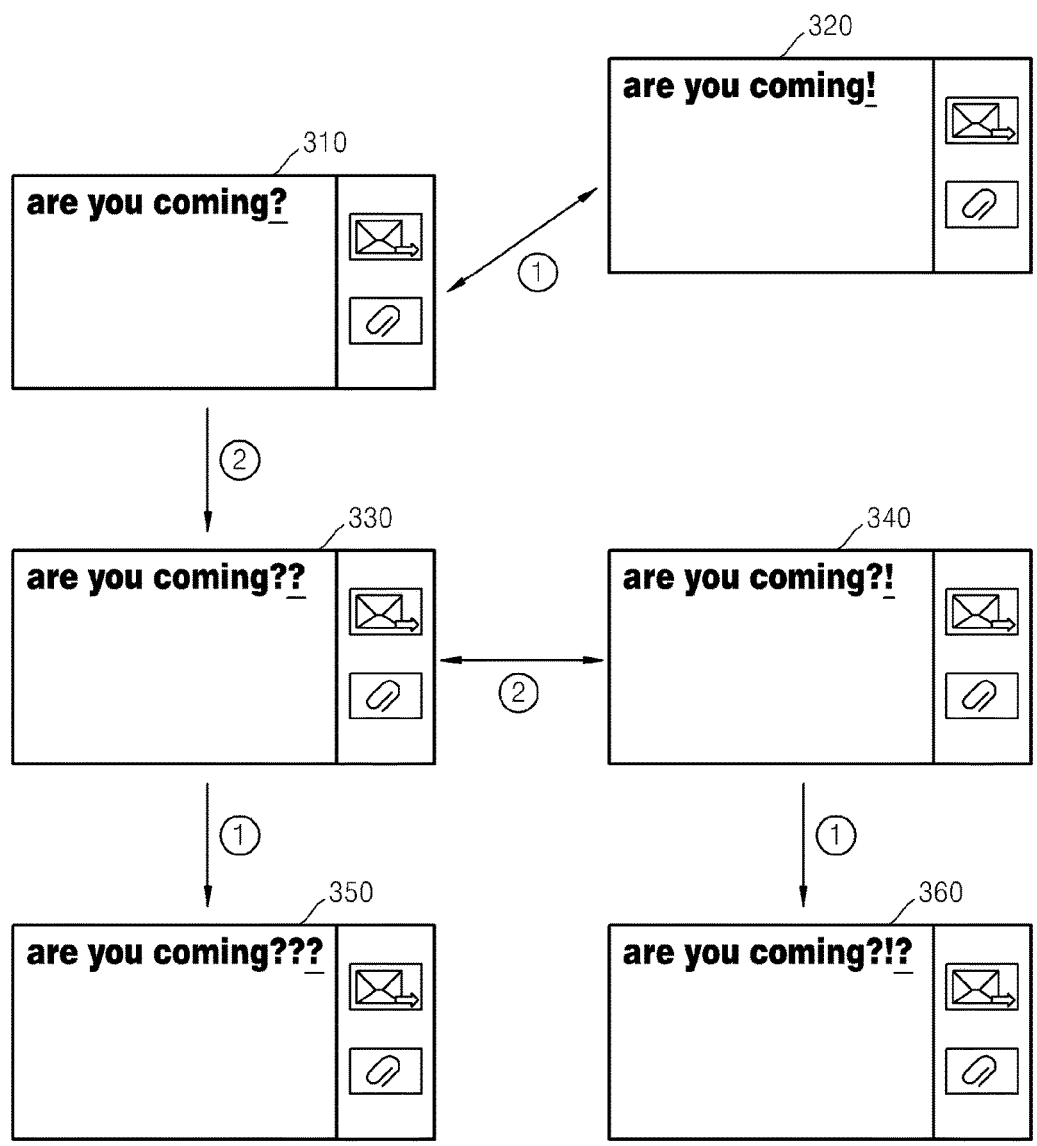
FIG. 3B is a diagram illustrating an input window when a key value is input using a keypad of FIG. 3A.

FIG. 3B is a diagram illustrating an input window when a key value is input using a keypad of FIG. 3A. The drawings of FIG. 3B show an input window when the user pushes key 301 in the keypad (①) and when the user pushes the dynamic key 302 for the key 301 (②) (it is assumed that a case where the cursor automatically moves to the next position by a passage of input waiting time does not occur).

If the user inputs "are you coming" and pushes the key 301, the input window 310 may be displayed. That is, "?", which is the first value among the key values allocated to the key 301, is displayed in the current cursor. If the user pushes the key 301 again in this state, "?" is changed to "!", which is the second key value allocated to the key (320). Whenever the user pushes the key 301, the input window is toggled between 320 and 310.

If, after pushing the key 101, the user pushes the dynamic key 302 instead of the key 301 in the input window 310, the "?" displayed at the cursor is typed as itself, and then the cursor moves to the next position and the "?", which is the first value allocated to the key, is displayed (330).

If the user pushes the dynamic key 302 again in the input window 330, the "?" displayed at the cursor is changed to the "!", which is the second value allocated to the key (340).

If the user pushes the key 301 in the input window 340, the "!" displayed at the cursor is typed as itself, and the cursor is moved to the next position so that the "?" which is the first value allocated to the key is displayed (360).

If the user pushes the key 301 in the input window 330, the "?" displayed at the cursor is typed, and the cursor moves to the next position and the "?" which is the first value allocated to the key is displayed (350).

Figure 4:
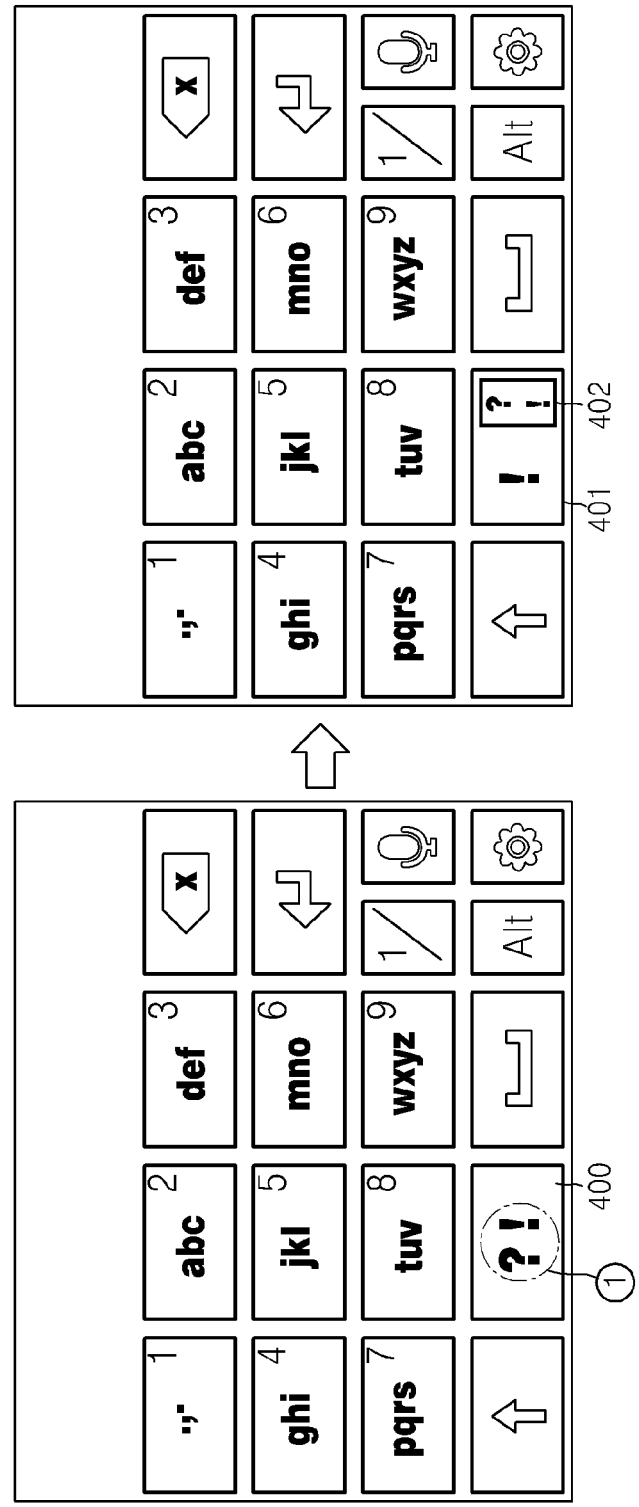
FIG. 4 is a diagram illustrating a keypad that displays a dynamic key according to another exemplary embodiment.

FIG. 4 is a diagram illustrating a keypad that displays a dynamic key according to another exemplary embodiment.

The dynamic key is displayed on the upper side of the keyboard in FIG. 3A, but the dynamic key 402 may be displayed at an internal side of the corresponding key 401 as illustrated in FIG. 4. At this time, the key value allocated to the key 401 may be covered by the dynamic key 402, and thus the values after the second value among the key values allocated to the key 401 may be displayed in the portion where the key values allocated to the key 401 are displayed. If the user pushes the key 400 in which "?" and "!" are allocated in order in the keypad on the left side of FIG. 4 (①), the dynamic key 402 is displayed at the internal side of the key 401 as shown in the keypad on the right side of FIG. 4. At this time, in order to indicate that the "?" displayed in the current cursor is changed to "!" if the user pushes the key 401 again, the "!", which is the second value allocated to the key 401, is displayed in the portion that is not covered by the dynamic key 402 in the key 401 as shown in the keypad on the right side of FIG. 4.

Figure 5:
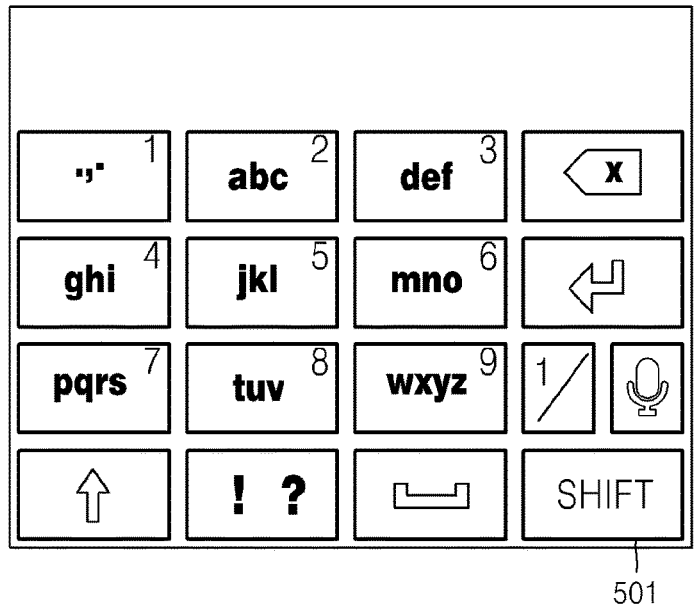
FIG. 5 is a diagram illustrating a keypad that implements a dynamic key according to another exemplary embodiment.

FIG. 5 is a diagram illustrating a keypad that implements a dynamic key according to another exemplary embodiment.

The function key 501 for operating all keys as dynamic keys is displayed on the keypad in the present exemplary embodiment. That is, if the user pushes another key in a state where the function key 501 is pushed, the key value displayed at the cursor is typed, and then the cursor moves to the next position so that one of the key values allocated to another key pushed by the user is displayed. Here, the first value among the key values allocated to the key may be displayed.

Figure 6:
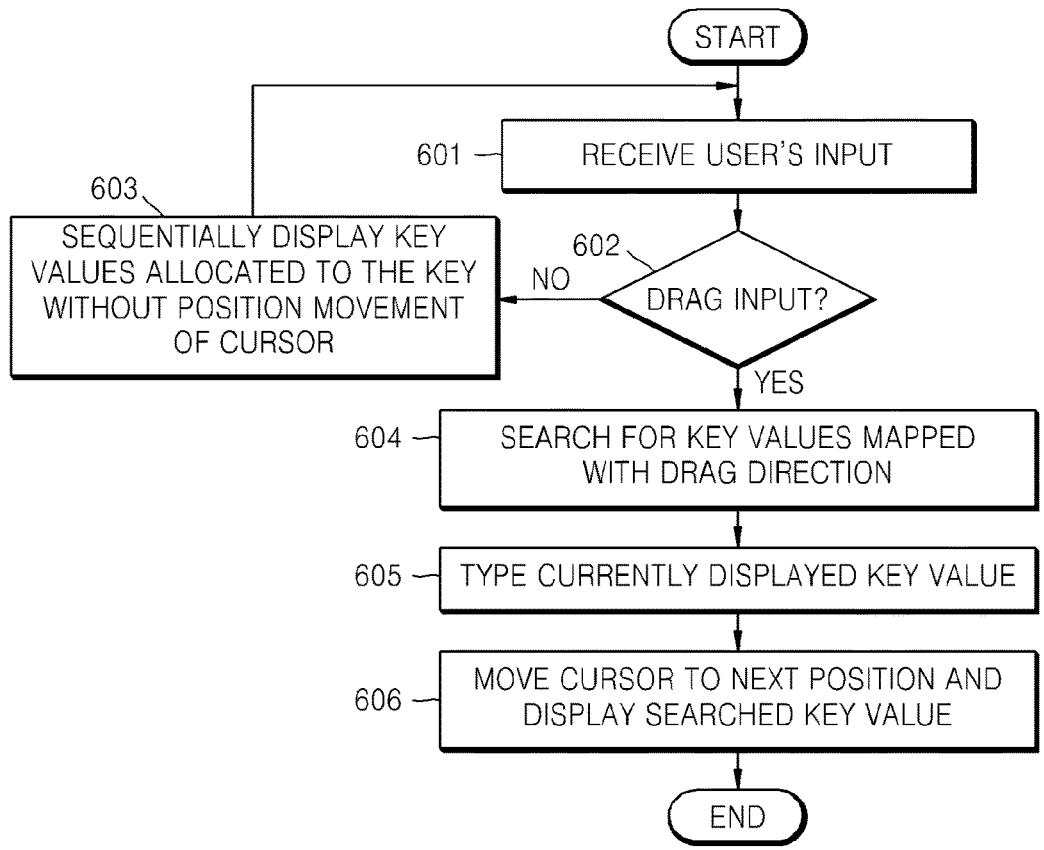
FIG. 6 is a flowchart illustrating a key input scheme that uses a drag input according to an exemplary embodiment.

FIG. 6 is a flowchart illustrating a key input scheme that uses a drag input according to an exemplary embodiment.

In the exemplary embodiments described above, a separate key (dynamic key or function key) has been used so that the key value displayed at the cursor is typed, the cursor is moved to the next position, and one key value may be displayed, but the same function may be performed according to a user's input type without changing the keypad in the present exemplary embodiment.

In operation 601, a mobile terminal receives a user's input through a touch screen.

In operation 602, the mobile terminal determines whether the received user's input is a drag input. In the present exemplary embodiment, the user's input may be either a drag input of moving a touch point to another position while pushing a button or a tab input of only pushing the button. If the user's input is a tab input, the process moves to operation 603, and if the user's input is a drag input, the process moves to operation 604.

In operation 603, the cursor sequentially displays the key values allocated to the key, without position movement.

In operation 604, the mobile terminal searches for a key value mapped with the dragging direction. That is, in the present exemplary embodiment, a plurality of key values allocated to one key are mapped with the directions of drag inputs for the key.

In operation 605, the mobile terminal types the key value displayed in the current cursor.

In operation 606, the cursor moves to the next position and displays the search result found in operation 604.

That is, in the present exemplary embodiment, if a drag input for a key is received, the key value displayed at the cursor is typed, and the cursor moves to the next position to display the key value mapped with the direction of the received drag input. The key input scheme using a drag input will be described below in detail with reference to FIGS. 7A and 7B.

Figure 7A:
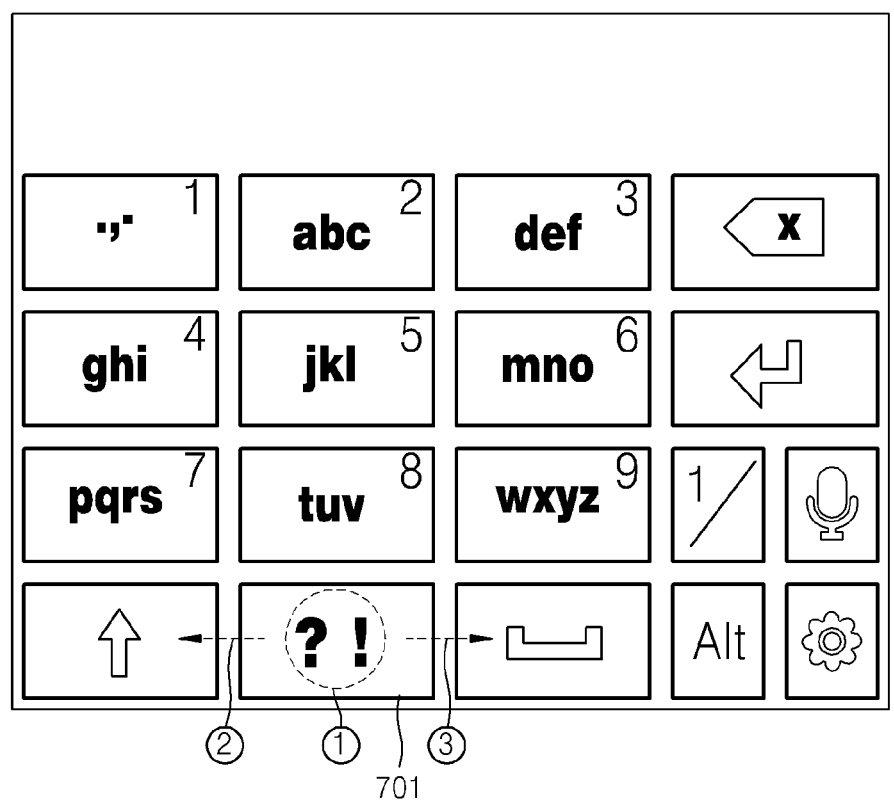
FIGS. 7A to 7B are diagrams illustrating a case where a key value is input using a drag input according to an exemplary embodiment.
Figure 7B:
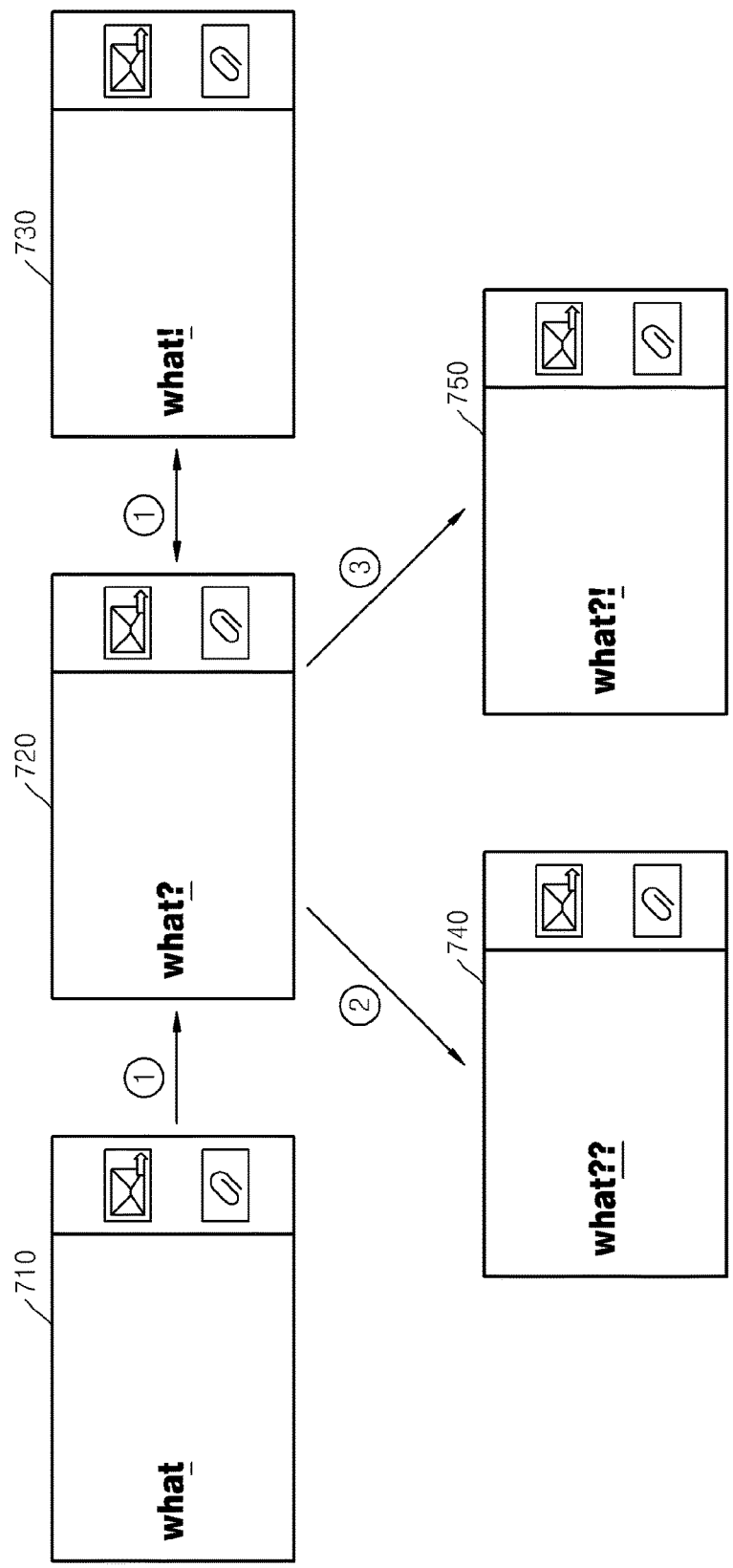

FIGS. 7A to 7B are diagrams illustrating a case where a key value is input using a drag input according to an exemplary embodiment.

FIG. 7A illustrates a keypad for processing a drag input. The keypad is similar to a general keypad, but it may be appropriate for the key value mapped with the dragging direction to be displayed in the same direction as the dragging direction within the key 701 for an intuitive input. That is, as illustrated in FIG. 7A, when "?" and "!" are allocated to the key 701, "?" is mapped with the drag in the left direction (②), and "!" is mapped with the drag in the right direction (③), "?" may be displayed in the left part of the inside of the key, and "!" may be displayed in the right part of the inside of the key.

FIG. 7B illustrates an input window when a key value is input using the keypad in FIG. 7A, and it is assumed that the case where the input waiting time passes and the cursor is automatically moved to the next position does not occur.

If the user tabs, or presses, the key 701 in a state where "what" has been input, that is, "t" is displayed at the current cursor (①), the input window becomes as shown in input window 720. That is, the "t" displayed at the cursor is typed, the cursor is moved to the next position, and "?" is displayed. This is because "t" and "?" are not key values allocated to the same button.

Whenever the user tabs the key 701 in the input window 720, the cursor sequentially displays the key values allocated to the key 701, and thus the input window is toggled between input windows 720 and 730.

In input window 720, if the user drags the key 701 in a left direction (②), the input window 740 may be displayed. That is, the "?" displayed at the cursor is typed, the cursor is moved to the next position, and "?" mapped with the drag (②) of the left direction is displayed among values allocated to the key 701. If the user drags (③) the key 701 in the right direction in the input window 720, the input window 750 may be displayed. That is, the "?" displayed at the cursor is typed and the cursor is moved to the next position so that the "!" mapped with the drag (③) of the right direction among the values allocated to the key 701 is displayed.

In the present exemplary embodiment, the drag input may be an independent input separate from a tab input, but may also include the tab input. For example, in input window 710, if the user touches the key 701 and drags the key 701 to the left side, the mobile terminal may recognize such an input as <tab+drag>, i.e., ①+②, and thus the input window 740 may be displayed.

Figure 8:
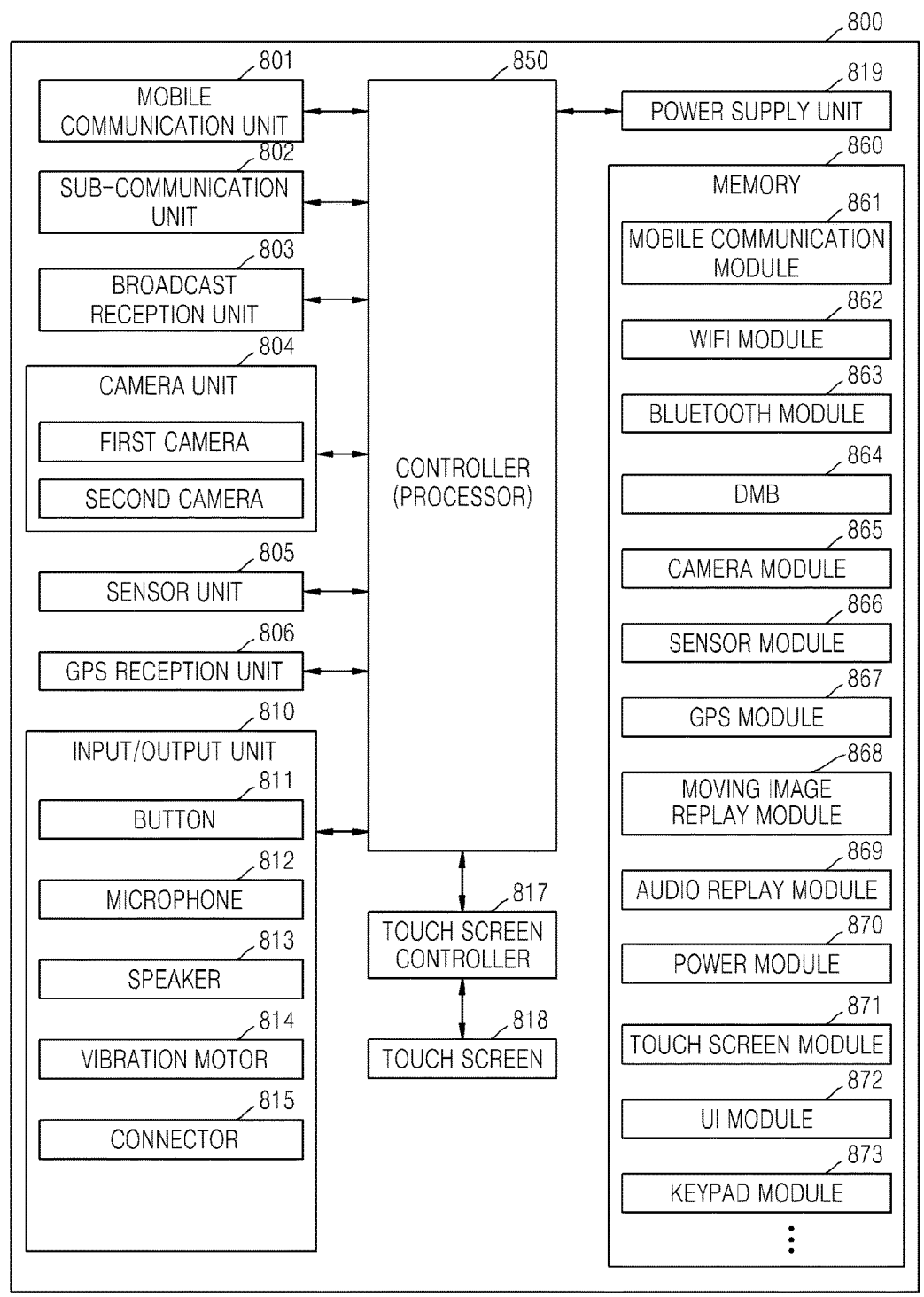
FIG. 8 is a diagram illustrating a structure of a mobile terminal that processes a user's key input according to an exemplary embodiment.

FIG. 8 is a diagram illustrating a structure of a mobile terminal that processes a user's key input according to an exemplary embodiment.

A mobile communication unit 801 performs a call setup and data communication with the base station through a cellular network such as 3G/4G. A sub-communication unit 802 performs a function for short range communication such as Bluetooth and near field communication (NFC). A broadcast reception unit 803 receives digital multimedia broadcast (DMB) signals.

A camera unit 804 includes a lens and optical devices for photographing photos or moving images.

A sensor unit 805 may include a gravity sensor that senses movement of a terminal 800, an illumination sensor that senses brightness of light, a proximity sensor that senses proximity of a person, a motion sensor that senses motion of a person, etc.

A global positioning system (GPS) reception unit 806 receives a GPS signal from an artificial satellite. Various services may be provided to the user using such a GPS signal.

An input/output unit 810 provides an interface with an external device or a person, and includes a button 811, a microphone 812, a speaker 813, a vibration motor 814, and a connector 815.

A touch screen 818 receives a user's touch input. Here, the touch input may be an input by a drag gesture or an input by a tab gesture. A touch screen controller 817 transmits a touch input that is input through a touch screen 818 to a controller 850. A power supply unit 819 is connected to a battery or external power source to supply necessary power to the mobile terminal 800.

The controller 850 executes the programs stored in a memory 860 so that the mobile terminal 800 may process the user's key inputs according to an exemplary embodiment.

The programs stored in the memory 860 may be classified into a plurality of modules such as a mobile communication module 861, a Wi-Fi module 862, a Bluetooth module 863, a DMB module 862, a camera module 865, a sensor module 866, a GPS module 867, a moving image replay module 868, an audio replay module 869, a power module 870, a touch screen module 871, a user interface (UI) module 872, and a keypad module 873, according to their functions.

The function of each module may be intuitively inferred from the module name by those skilled in the art, and thus, only the keypad module 873 will be described here. The keypad module 873 processes a user's input received through the touch screen 818 in the mobile terminal 800.

The keypad module 873 includes an executable command that displays the dynamic key on the screen if the key to which a plurality of key values are allocated is input, and types the key value displayed at the cursor, moves the cursor to the next position and displays one of the key values if the dynamic key is input. Thereafter, the keypad module 873 may include an executable command that sequentially displays the key values allocated to the dynamic key without movement of the position of the cursor if the dynamic key is continuously input, and types the input key value displayed at the cursor by the dynamic key, moves the cursor to the next position and displays one of the key values if the key is input again.

Furthermore, the keypad module 873 may include executable commands that process a user's input using the function key which is distinguished from the dynamic key as described with reference to FIG. 5.

Furthermore, the keypad module 873 may sequentially display key values without position movement of the cursor, depending on whether the user's touch input is a tab or drag without using a separate key, or may include commands that display the key value mapped with the drag direction after typing the key value displayed in the current cursor and moving the cursor to the next position as illustrated in FIGS. 6, 7A and 7B.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of processing an input received through a touch screen in a mobile terminal, the method comprising:
   displaying, on the screen, a first key, wherein a plurality of key values are allocated to the first key and at least one key value among the plurality of key values is displayed on the first key;
   in response to receiving an input on the first key, displaying a key value among the plurality of key values at a current position of a cursor, and displaying, on the screen, a second key while maintaining the display of the first key, wherein the same plurality of key values are allocated to the second key and the at least one key value is displayed on the second key;
   when a repeated input on the first key is received after the input on the first key, changing the key value displayed at the current position of the cursor to another key value among the plurality of key values without moving the position of the cursor; and
   when an input on the second key is received after the input on the first key, moving the cursor to a next position while maintaining the key value displayed at the current position of the cursor, and displaying one of the plurality of key values at the next position.

2. The method of claim 1, further comprising:
   sequentially displaying the plurality of key values without moving the position of the cursor, whenever receiving repeated input on the second key after the cursor is moved from the current position to the next position; and
   when an input on the first key is received, moving the cursor to a subsequent position while maintaining the key value displayed at the next position of the cursor, and displaying one of the plurality of key values at the subsequent position.

3. The method of claim 1, further comprising sequentially displaying the plurality of key values without moving the position of the cursor whenever receiving repeated input on the second key after the cursor is moved from the current position to the next position.

4. A non-transitory computer-readable recording medium having stored thereon a computer program, which, when executed by a computer, performs the method of claim 1.

5. The method of claim 1, wherein the displaying the second key comprises displaying the same plurality of key values allocated to the first key and the second key twice as the first key and the second key.

6. A mobile terminal comprising:
   a memory configured to store at least one program; and
   a processor configured to process an input received through a touch screen by executing the at least one program,
   wherein the at least one program comprises commands for performing:
      displaying, on the screen, a first key, wherein a plurality of key values are allocated to the first key and at least one key value among the plurality of key values is displayed on the first key;
      in response to receiving an input on the first key, displaying a key value among the plurality of key values at a current position of a cursor, and displaying, on a screen, a second key while maintaining the display of the first key, wherein the same plurality of key values are allocated to the second key and the at least one key value displayed on the second key
   when a repeated input on the first key is received after the input on the first key, changing the key value displayed at the current position of the cursor to another key value among the plurality of key values without moving the position of the cursor; and
   when an input on the second key is received after the input on the first key, moving the cursor to a next position while maintaining the key value displayed at the current position of the cursor, and displaying one of the plurality of key values at the next position.

7. The mobile terminal of claim 6, wherein the at least one program further comprises commands for performing:
   sequentially displaying the plurality of key values without moving the position of the cursor, whenever receiving a repeated input on the second key after the cursor is moved from the current position to the next position; and
   when an input on the first key is received after the input on the second key, moving the cursor to subsequent position while maintaining the key value displayed at the next position of the cursor, and displaying one of the plurality of key values at the subsequent position.

8. The mobile terminal of claim 6, wherein the at least one program further comprises commands for performing sequentially displaying the plurality of key values without moving the position of the cursor whenever receiving a repeated input on the second key after the cursor is moved from the current position to the next position.

9. A method of processing an input received through a touch screen in a mobile terminal, the method comprising:
   displaying a first key to which a plurality of key values are allocated;
   displaying a key value among the plurality of key values at a current position of a cursor in an input window of the screen and displaying a second key to which the plurality of key values are allocated, based on a first selection of the first key;
   moving the cursor to a next position in the input window and displaying the key value at the next position in the input window, based on a second selection of the second key after the first selection; and
   changing the displayed key value at the next position in the input window to another one from among the plurality of key values, based on a third selection of the second key when the cursor is at the next position; and moving the cursor to a subsequent position in the input window, based on a fourth selection of the first key when the cursor is at the next position.

\* \* \* \* \*